(12) United States Patent
Sokolofsky

(10) Patent No.: US 9,279,485 B2
(45) Date of Patent: Mar. 8, 2016

(54) COMBINATION LINEAR AND ROTARY ACTUATOR

(71) Applicant: DELPHI TECHNOLOGIES, INC., Troy, MI (US)

(72) Inventor: Phillip M Sokolofsky, Akron, NY (US)

(73) Assignee: Delphi Technologies, Inc., Troy, MI (US)

( * ) Notice: Subject to any disclaimer, the term of this patent is extended or adjusted under 35 U.S.C. 154(b) by 219 days.

(21) Appl. No.: 14/179,751

(22) Filed: Feb. 13, 2014

(65) Prior Publication Data

US 2015/0226292 A1    Aug. 13, 2015

(51) Int. Cl.
| | |
|---|---|
| *F16H 19/04* | (2006.01) |
| *F16H 1/04* | (2006.01) |
| *B60H 1/00* | (2006.01) |
| *F16H 35/00* | (2006.01) |

(52) U.S. Cl.
CPC ............ *F16H 19/04* (2013.01); *B60H 1/00842* (2013.01); *B60H 1/00857* (2013.01); *F16H 35/00* (2013.01); *Y10T 74/18976* (2015.01)

(58) Field of Classification Search
CPC ............ B60H 2001/00721; B60H 2001/3478; B60H 2001/3485; B60H 1/00642; B60H 1/00814; B60H 1/00835; B60H 1/00842; B60H 1/00857; B60H 1/3421; F16H 19/02; F16H 19/08; F16H 19/04; F16H 19/043; F16H 25/08; F16H 25/16; F16H 37/12; F16H 37/16; F16H 37/124; F16H 53/02; F16H 53/04; F16H 63/08; F16H 63/10; F16H 63/12; F16H 63/18; F24F 2013/1473; Y10T 74/1888; Y10T 74/18288; Y10T 74/18976
USPC ............ 74/422; 454/139, 140, 156, 157, 158, 454/159, 161
See application file for complete search history.

(56) References Cited

U.S. PATENT DOCUMENTS

| | | | | |
|---|---|---|---|---|
| 2,748,605 | A * | 6/1956 | Allen ...................... | F16H 19/04 251/160 |
| 5,582,067 | A * | 12/1996 | Snider ..................... | F16H 19/04 74/109 |
| 5,862,896 | A * | 1/1999 | Villbrandt ................. | B60R 7/06 16/49 |
| 6,209,404 | B1 * | 4/2001 | Le ...................... | B60H 1/00842 454/69 |
| 6,793,573 | B2 * | 9/2004 | Ueda .................. | B60H 1/00692 251/248 |
| 7,065,829 | B2 * | 6/2006 | Okabayashi .............. | B60R 7/06 16/354 |
| 7,517,278 | B2 * | 4/2009 | Sokolofsky ........ | B60H 1/00514 137/865 |
| 7,717,009 | B2 * | 5/2010 | Cho ....................... | B60N 3/083 188/290 |
| 7,735,802 | B2 * | 6/2010 | Akabane ............. | F24F 13/1426 251/129.11 |
| 7,926,370 | B2 * | 4/2011 | Kawabuchi ............. | F16H 37/12 414/739 |
| 2010/0011799 | A1* | 1/2010 | Sakakibara .......... | B60H 1/3414 62/426 |
| 2010/0101408 | A1* | 4/2010 | Keel ...................... | F15B 15/065 92/129 |
| 2013/0020264 | A1* | 1/2013 | Reiss, Jr. ................ | B01D 29/03 210/739 |

* cited by examiner

*Primary Examiner* — William Kelleher
*Assistant Examiner* — Leonard J Archuleta
(74) *Attorney, Agent, or Firm* — Brinks Gilson & Lione

(57) ABSTRACT

An actuator consists of a pair of compact cam plates with compound straight and semicircular toothed racks that engage a single circular gear turned by a single motor. As the gear turns in one direction, the cam plates are pulled toward one another in a guided straight line until they engage and lock around the gear. Continued turning of the gear rotates the locked cam plates with the gear. The motion is reversed as the gear reverses.

4 Claims, 5 Drawing Sheets

COMBINATION LINEAR AND ROTARY ACTUATOR

TECHNICAL FIELD

This invention relates to actuators in general and specifically to a combination linear and rotary actuator.

BACKGROUND OF THE INVENTION

Automotive air conditioning housings typically contain at least two flapper type air flow control doors, each rotated between open and closed limit positions by a crank pivoted to and through a wall of the housing. While each can be rotated and controlled by a dedicated, individual motor, it would be potentially a cost and space saving measure to operate and control both doors with a single motor. Prior proposals to do so have involved very complex and bulky systems of multiple levers or multiple gear reduction systems, which involve numerous degrees of freedom and consequent play and rattle in the system, as well as expense and occupied volume that detract from the advantage of using a single motor.

SUMMARY OF THE INVENTION

The subject invention provides a simple and compact actuator that runs and controls a pair of doors on an air conditioning housing with a single motor.

In the embodiment disclosed, a pair of door cranks with pins near the crank ends are pivoted to and through a wall of an air conditioning housing at widely spaced locations. Each crank moves a door inside the housing between open and closed positions as it is rotated over a predetermined arc.

A motor support and guide bracket is bolted to the housing wall spaced therefrom and, overlaying the cranks. A single motor mounted to the outside of the bracket wall turns a single circular gear located inside the bracket. Formed through the bracket are a pair of parallel straight guide slots which open into a diagonally opposed, semi circular clearance slots centered on the gear axis.

An interleaved pair of first and second cam plates is stacked between the bracket and the housing wall. The inside of each cam plate, facing the circular gear, has a straight toothed rack engaged with one side of the circular gear and a semi circular toothed rack that matches about one quarter of the circular gear The cam plate racks face in opposed directions, and the cam plates are arranged to slide linearly in opposite direction, each with a guide pin that rides in a respective bracket guide slot. In addition, each cam plate has a flange that rides on a straight guide track on the bracket until that is coextensive with the straight toothed rack portion of each cam plate.

As the circular gear rotates in one direction, the cam plates are pulled toward one another in a straight line until their toothed arcs concurrently engage the circular gear. As they do so, interfitting slide locks on the cam plates engage to lock the cam plates to the gear. Further rotation of the gear rotates the locked together cam plates about the gear axis as the guide flanges move off of the guide tracks and the guide pins move out of the bracket's straight guide slots and into the semi-circular clearance slots. Reverse rotation of the gear reverses the path of the cam plates, rotating in the opposite direction and then sliding linearly apart back to the starting point.

In the embodiment disclosed, the pins on the ends of the pivoted cranks ride in cam tracks on the inner surface of the cam plates. Each cam track has active and inactive portions, either straight or curved, that respectively actively pivot the cranks over the desired path, or leave them stationary as the cam plates move. Thereby, all of the motion of the single pair of compact cam plates, linear and rotating, can be used to pivot the levers, and thereby operate the valve doors, from a single motor, and in a compact and closely guided fashion.

DESCRIPTION OF THE PREFERRED EMBODIMENT

Figure 1:
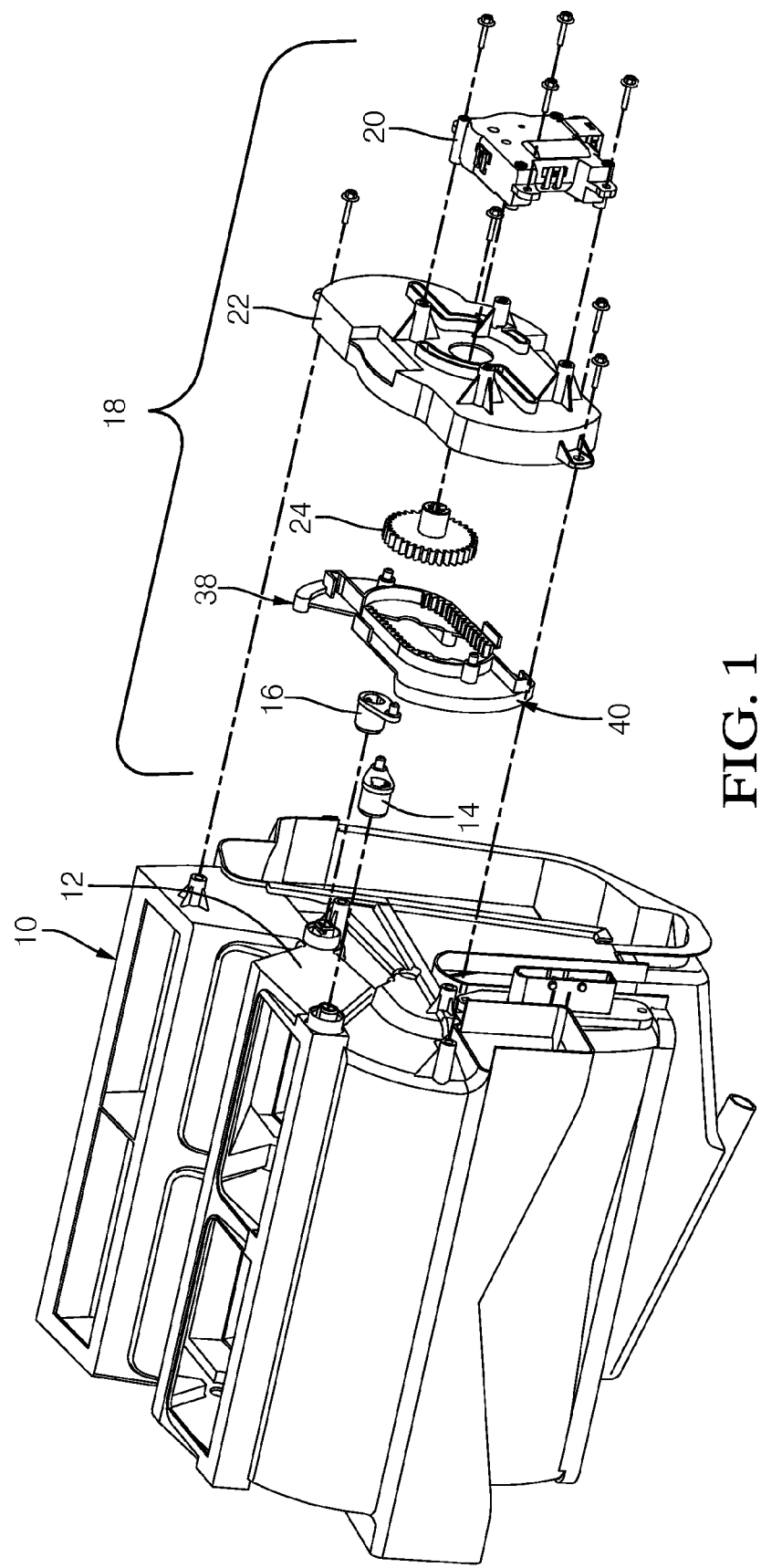
FIG. 1 is a an exploded perspective view of view of a preferred embodiment of the invention.

Referring first to FIG. 1, in the preferred embodiment disclosed, the foundation structure is an HVAC housing, indicated generally at 10, which has a side wall 12 through and which an upper and lower crank 14 and 16 are pivoted. Cranks 14 and 16, each with an end pin 15 and 17, move a pair of flapper doors, not visible in the figure, inside housing 10 between limit positions. The combination linear and rotating actuator of the invention, indicated generally at 18, is shown in a disassembled view, and consists of only four basic compact elements, operated by a single conventional reversible electric motor 20. Motor 20 would have a conventional controller, not shown, to rotate it back and forth to a degree sufficient to move actuator 18 sufficiently to in turn move cranks 14 and 16.

Figure 2:
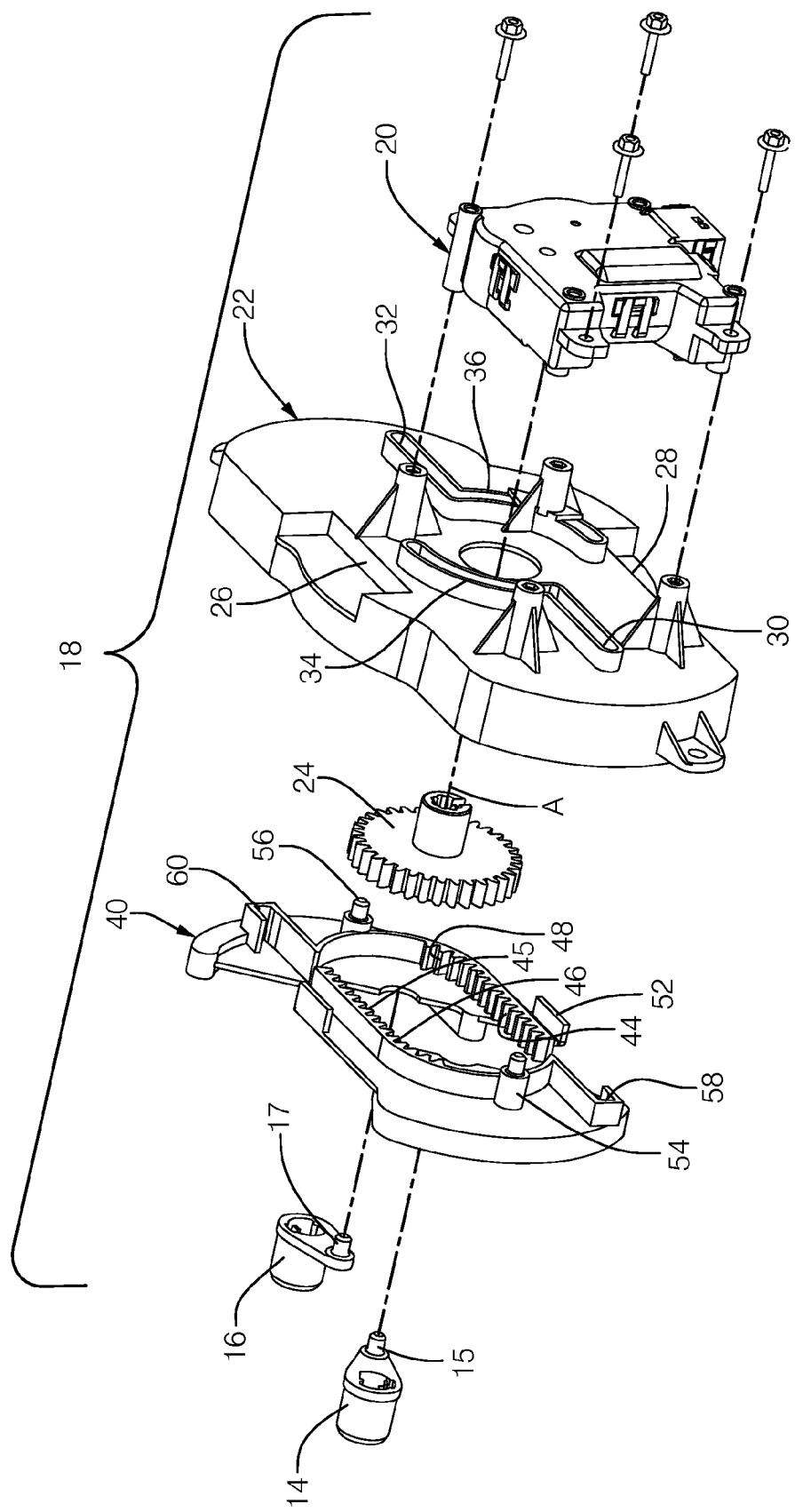
FIG. 2 is an enlarged view of the actuator components of Figure
Figure 3:
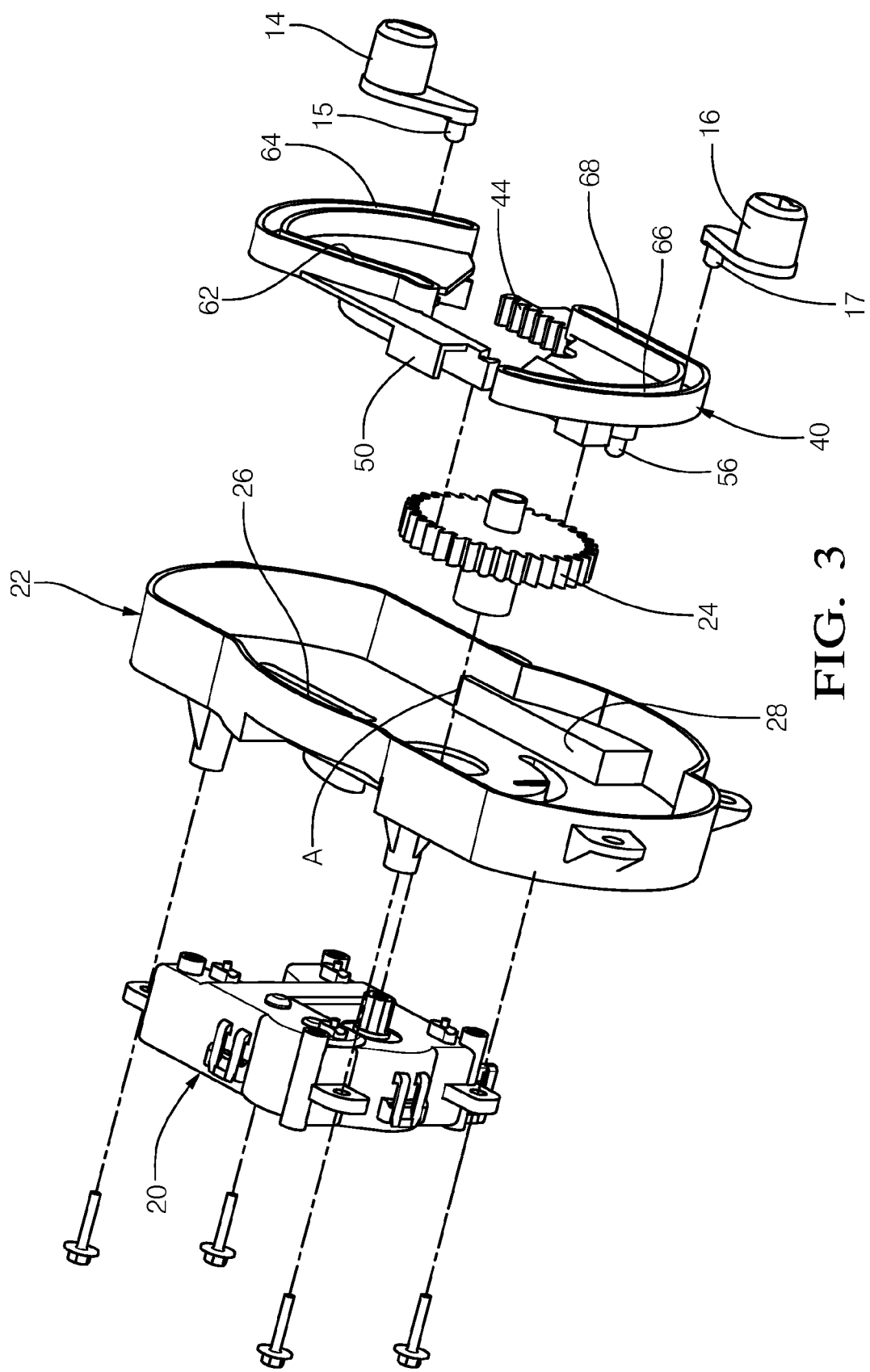
FIG. 3 is a view like FIG. 2, but sighting in the opposite direction.

Referring next to FIGS. 2 and 3, one of the four basic components is a molded plastic support bracket 22, which supports motor 20 on the outside, and which is bolted to the housing side wall 12 with a relatively thin space therebetween. This space is thick enough to house a large toothed circular gear 24, which is shafted to motor 20 to turn one to one therewith about central axis A. Bracket 24 also contains a pair of upper and lower, straight guide tracks 26 and 28, and a pair of upper and lower straight guide slots 30 and 32, all mutually parallel. Each straight guide slot 30 and 32 opens into one of a pair of semi-circular clearance slots 34 and 36 respectively, which are concentric to axis A and diagonally opposed. Again, bracket 22 and all of its structural features are rigid and fixed relative to the housing side wall 12.

Still referring to FIGS. 2 and 3, the other two basic components of the invention are a pair of actuator members, which are upper and lower cam plates indicated generally at 38 and 40. Cam plates 38 and 40, also molded plastic, are nested and stacked in the space between the inside of bracket 22 and outside of housing side wall 12, so as to be able to slide back and forth without mutual interference. On their outer surfaces, facing the inside of bracket 22, each cam plate 38 and 40 has a straight toothed rack 42 and 44 respectively, parallel to one another, culminating in a semi-circular toothed rack 46, 48, diagonally opposed to one another, and matching the diameter of the gear 24. All toothed racks interfit with the circular gear 24 closely. In addition, each cam plate 38 and 40 has a respective guide flange 50, 52 that rides freely but closely along a respective guide track 26, 28 on bracket 22. The outer surface of each respective cam plate 38 and 40 also has a projecting guide pin 54, 56 that rides closely in an aligned pair of guide slots 30, 32 and clearance slots 34, 36. Finally, each cam plate 38, 40 has a straight sided hook 58, 60 at the end of respective semi-circular toothed rack 48, 46, sized to slidably receive the end of the straight tooted rack 44, 42 respectively of the opposite cam plate 40, 38.

Figure 4:
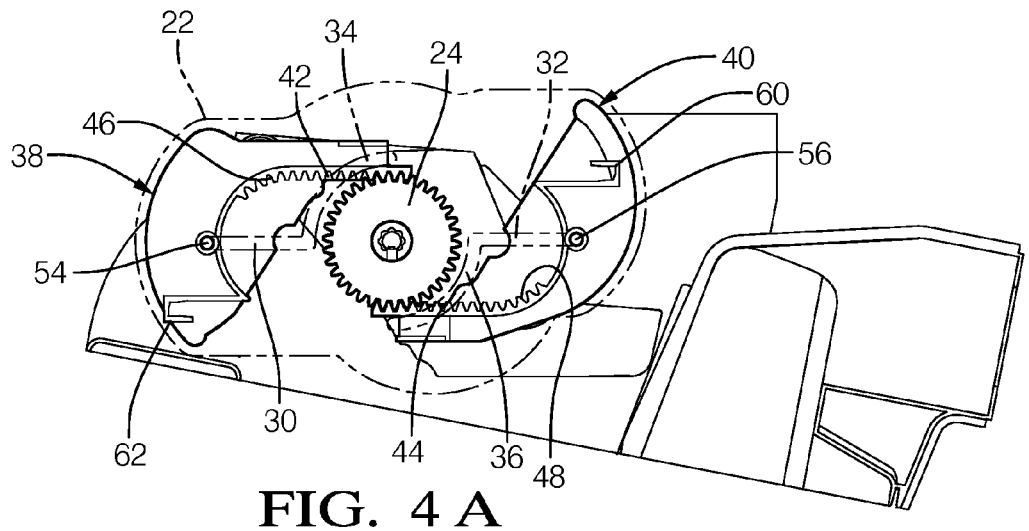
FIGS. 4A-4C are views of the device looking through the broken away support bracket as it moves.
Figure 4:
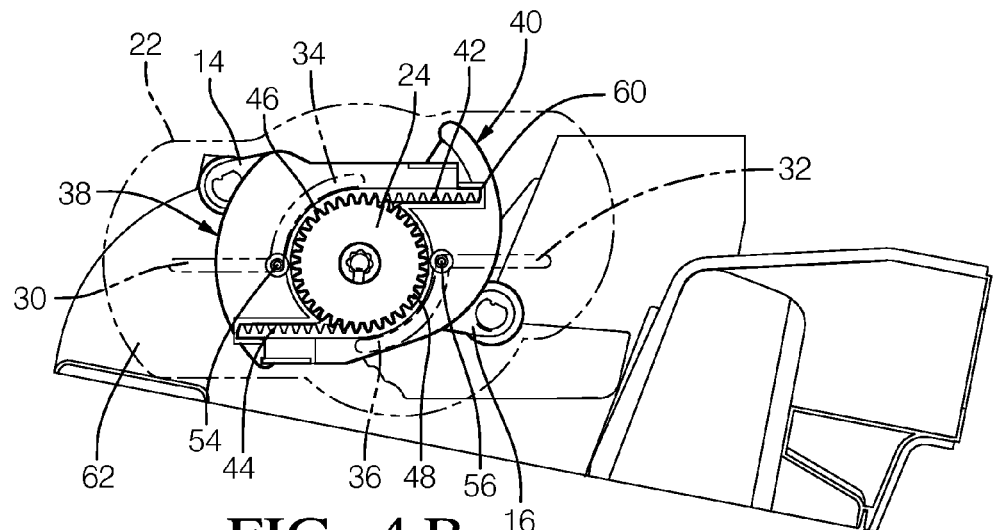
Figure 4:
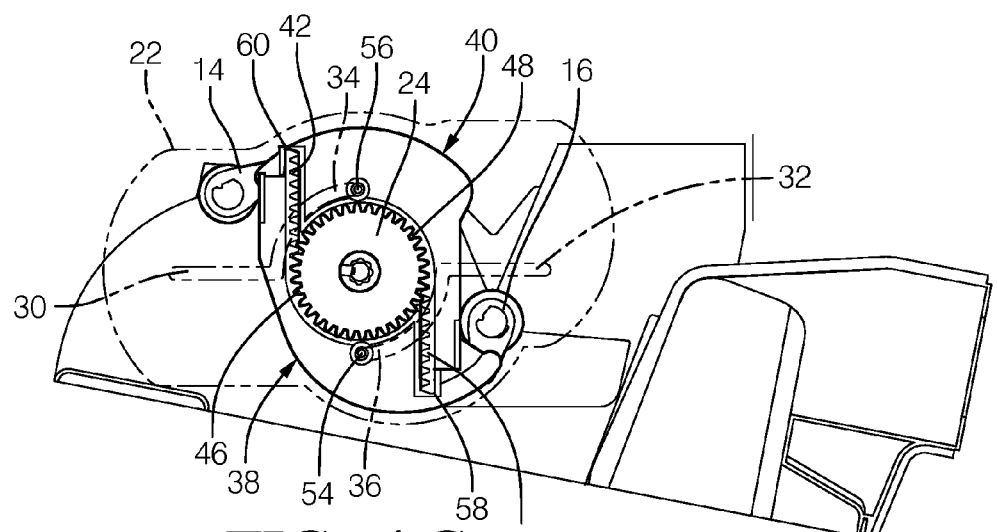

Referring next to FIGS. 4A-4C, the basic operation of the actuator 18, which is to say, its basic motion divorced from components that it operates, is illustrated. As seen in FIG. 4A, as gear 24 begins to turn in the clockwise direction, the straight toothed racks 42 and 44 are pulled together in a straight line in opposite directions, guided by the engagement of the guide flanges 50 and 52 with the bracket guide tracks 26 and 28, and also by the guide pins 54 and 56 riding in the straight guide slots 30 and 52. This initial motion continues until, as seen in FIG. 4B, the circular toothed racks 46 and 48 engage the gear 24 and the ends of the straight guide tracks 42 and 44 slide into the hooks 60 and 58. This serves to lock the cam plates 38 and 40 tight to the gear 24 as, concurrently, the guide pins 54 and 56 move into the semicircular clearance slots 34, 36. At that point, the cam plates 38 and 40 are caused to rotate with gear 24, as seen in FIG. 3C, and the flanges 50 and 52 rotate away from the guide tracks 26 and 28 until the motor 20 and gear 24 are stopped by the non illustrated control system. The motion reverses itself as motor 20 and gear 24 rotate in the opposite direction, back to the FIG. 4A position. Thereby, essentially all of the available motion of gear 24 is turned into potentially useful motion of the cam plates 38 and 40, linear and rotating, closely guided with very little play, and all within the relatively compact space between bracket 20 and the housing side wall 12 and bracket 24.

Referring next to FIGS. 3 and 5A-5C, the inside surfaces of the cam plates 38 and 40, those facing the side wall 12, have additional structure that serves to translate the basic motion just described into motion of the cranks 14 and 16. Cam plate 38 has a basically linear cam track 62, sloped upwardly relative the bracket guide tracks 26 and 28, which receives the crank pin 15. Linear cam track 62 terminates in a semicircular clearance track 64, which is concentric to gear 24. Cam plate 40 has an arcuate cam track 66, which is not concentric to gear 24, and which receives the crank pin 17. Arcuate cam track 66 terminates in a straight clearance track 68, which is parallel to the bracket guide tracks 26 and 28. Finally, each crank 14 and 16 is fixed to a respective flapper door 70 and 72 (a double door in the case of door 72) which rotate between limit positions to control various air flows within the housing 10.

Figure 5:
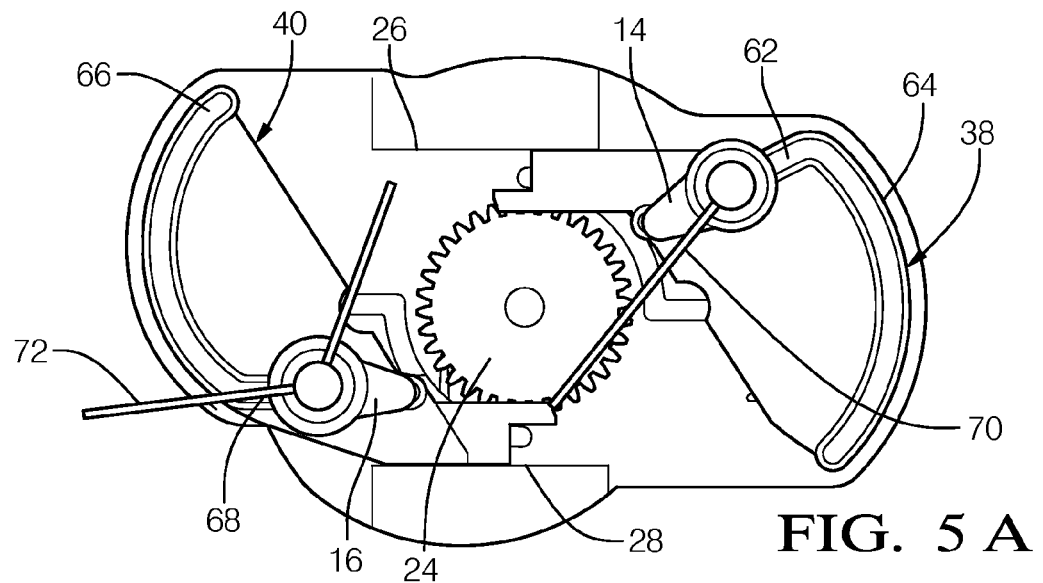
FIGS. 5A-5C are views of the device corresponding to FIGS. 4A-4C, but looking in the opposite direction and showing how the actuator device moves the cranks and flapper doors.
Figure 5:
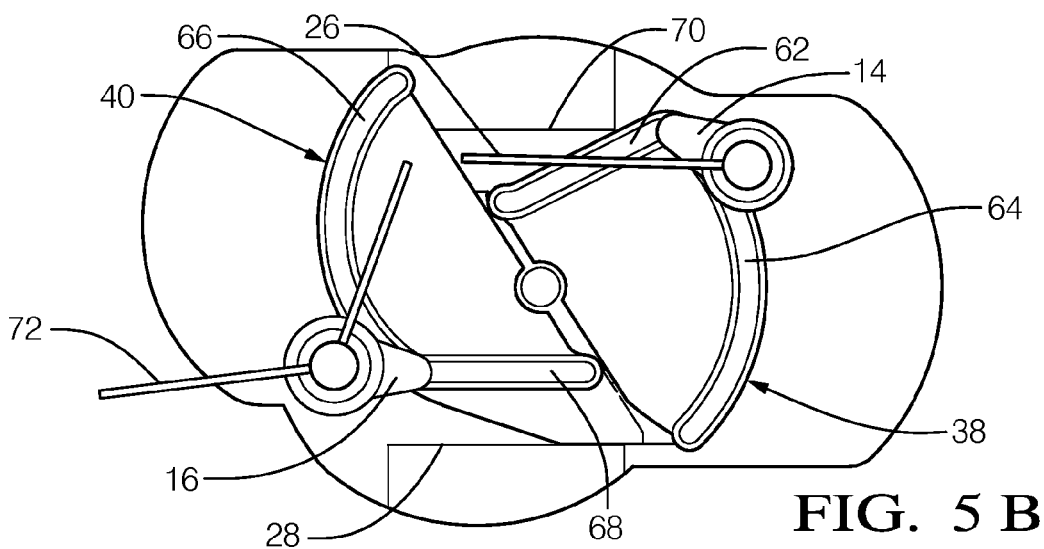
Figure 5:
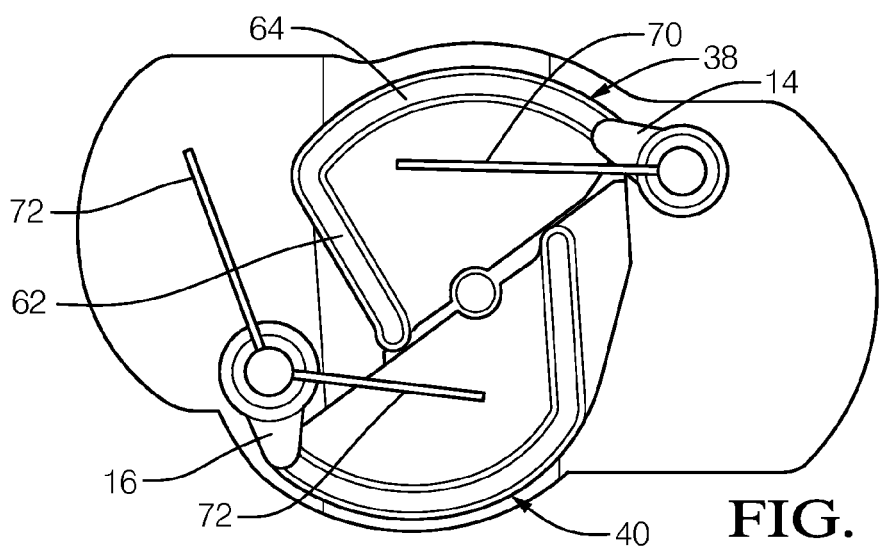

Referring now to FIGS. 5A-5C, FIG. 5A shows the starting position, equivalent to FIG. 4A. As gear 24 begins to rotate (counterclockwise, but only from the perspective of FIG. 5A) and the cam plates 38 and 40 are pulled together, upper crank pin 15 is pulled through cam track 62 as lower crank pin 17 is pulled through straight lower clearance track 68. As straight cam track 62 is upwardly sloped relative to the guide tracks 26 and 28, crank pin 18 is pushed up, rotating crank 14 clockwise, and rotating flapper door 70 with it.

Concurrently, lower crank pin 17 rides freely in the clearance track 68, and crank 16 is unaffected, as is flapper door 72. When the cam plates 38, 40 are pulled all the way together, and lock to gear 14, as shown in FIG. 5B (equivalent to the FIG. 4B position), upper crank pin 15 moves into the semicircular clearance track 64, where, since it is concentric to gear 24, it creates no more motion in upper crank 14.

Concurrently, lower crank pin 17 moves into arcuate cam track 66, which, since it is not concentric to gear 24, rotates lower crank 16 clockwise, also rotating flapper door 72 to the position shown in FIG. 5C (which corresponds to FIG. 4C.)

The doors 70 and 72 are thus reversibly rotated between their limit positions by a single motor 20 and gear 24 combination, and only three other compact components, the cam plates 38, 40 and guide bracket 22. No second motor or complex crank or gear mechanisms are needed. The system is compact and well guided, with very limited rattle, and fully reversible.

The basic invention could be incorporated in environments other than that disclosed. Fundamentally, the actuator's reversible combination of linear and rotating motion could be used to operate a number of different actuating members, any that could translate both linear and rotating motion into useful work. In the preferred embodiment disclosed, the semicircular clearance slots 34 and 36 are not necessary for the basic operation of the actuator, but do help to guide the guide pins 54 and 56 back into the straight guide slots 30 and 32. Likewise, the clearance tracks 64 and 68 are not necessary to the basic operation of the cranks 14 and 16, but do serve to guide the cam pins 15 and 17 into the active cam tracks 62 and 66.

The invention claimed is:

1. A combination linear and rotating actuator, comprising,
    a foundation structure,
    a powered circular gear rotatable back and forth about a gear axis fixed relative to said foundation structure,
    a first actuator member having a straight toothed rack engaged with one side of said gear and a semicircular toothed rack engageable with said gear,
    a second actuator member having a straight toothed rack engaged with an opposite side of said gear and a semicircular toothed rack engageable with said gear,
    linear guide tracks engageable between the actuator members and said foundation structure to guide said actuator members in a reversible linear path parallel with and toward one another as said gear rotates in one direction until said actuator member semi-circular toothed racks concurrently engage said gear, and,
    slide locks on said actuator members mutually interfitting as said semi-circular toothed racks engage said gear to lock said actuator members to and around said gear,
    said locked actuator members moving in a reversible rotating path with said gear as said gear continues to rotate.

2. A combination linear and rotating actuator assembly, comprising,
    a foundation structure,
    a first and second crank member pivoted to said foundation structure at
    spaced apart locations and pivotable about crank axes fixed relative to said foundation structure,
    a powered circular gear rotatable back and forth about a gear axis fixed relative to said foundation structure and intermediate said crank axes,
    a first cam plate having a straight toothed rack engaged with one side of said gear and a semicircular toothed rack engageable with said gear,
    a second cam plate having a straight toothed rack engaged with an opposed side of said gear and a semicircular toothed rack engageable with said gear,
    linear guide tracks engageable between said cam plates and said foundation structure to guide said cam plates in a reversible linear path parallel with and toward one another as said gear rotates in one direction until said cam plate semi-circular toothed racks concurrently engage said gear,
    slide locks on said cam plates mutually interfitting as said semi-circular toothed racks engage said gear to lock said cam plates to and around said gear,
    said locked cam plates moving in a reversible rotating path with said gear as said gear continues to rotate, a cam track on said first cam plate that rotates said first crank in one direction as said first cam plate moves in one direction and reverses the first crank as it reverses, and a cam track on said second cam plate that rotates said second crank in one direction as said second cam plate moves in one direction and reverses the second crank as it reverses.

3. An actuator according to claim 2, in which said linear guide tracks are formed in a bracket fixed to said foundation structure.

4. An actuator according to claim 3 in which the bracket includes linear guide slots that receive guide pins on the cam plates.

* * * * *